United States Patent [19]

Drake

[11] Patent Number: 5,160,267
[45] Date of Patent: Nov. 3, 1992

[54] PROGRAMMED LEARNING DEVICE

[76] Inventor: James S. Drake, 112 Knollwood Ct., Goodlettsville, Tenn. 37072

[21] Appl. No.: 770,853

[22] Filed: Oct. 3, 1991

[51] Int. Cl.$^5$ ............................................. G09B 3/00
[52] U.S. Cl. ................................... 434/349; 434/348
[58] Field of Search ................ 434/347, 348, 349, 331

[56] References Cited

U.S. PATENT DOCUMENTS

| | | | |
|---|---|---|---|
| 3,218,733 | 11/1965 | Roop et al. | 434/349 |
| 3,230,641 | 1/1966 | Sloves | 434/348 |
| 3,400,470 | 9/1968 | Ritter | 434/349 |

Primary Examiner—John G. Weiss
Attorney, Agent, or Firm—Mark J. Patterson; Edward D. Lanquist, Jr.

[57] ABSTRACT

The present invention discloses a programmed learning device having a cover, a backing, and a leaf. An information sheet is releasably attached to the backing. The leaf folds over on top of the backing. The leaf has windows in it which expose certain portions of the information sheet. Tracks within the leaf receive a masking slide to cover certain portions of answer sheet.

12 Claims, 3 Drawing Sheets

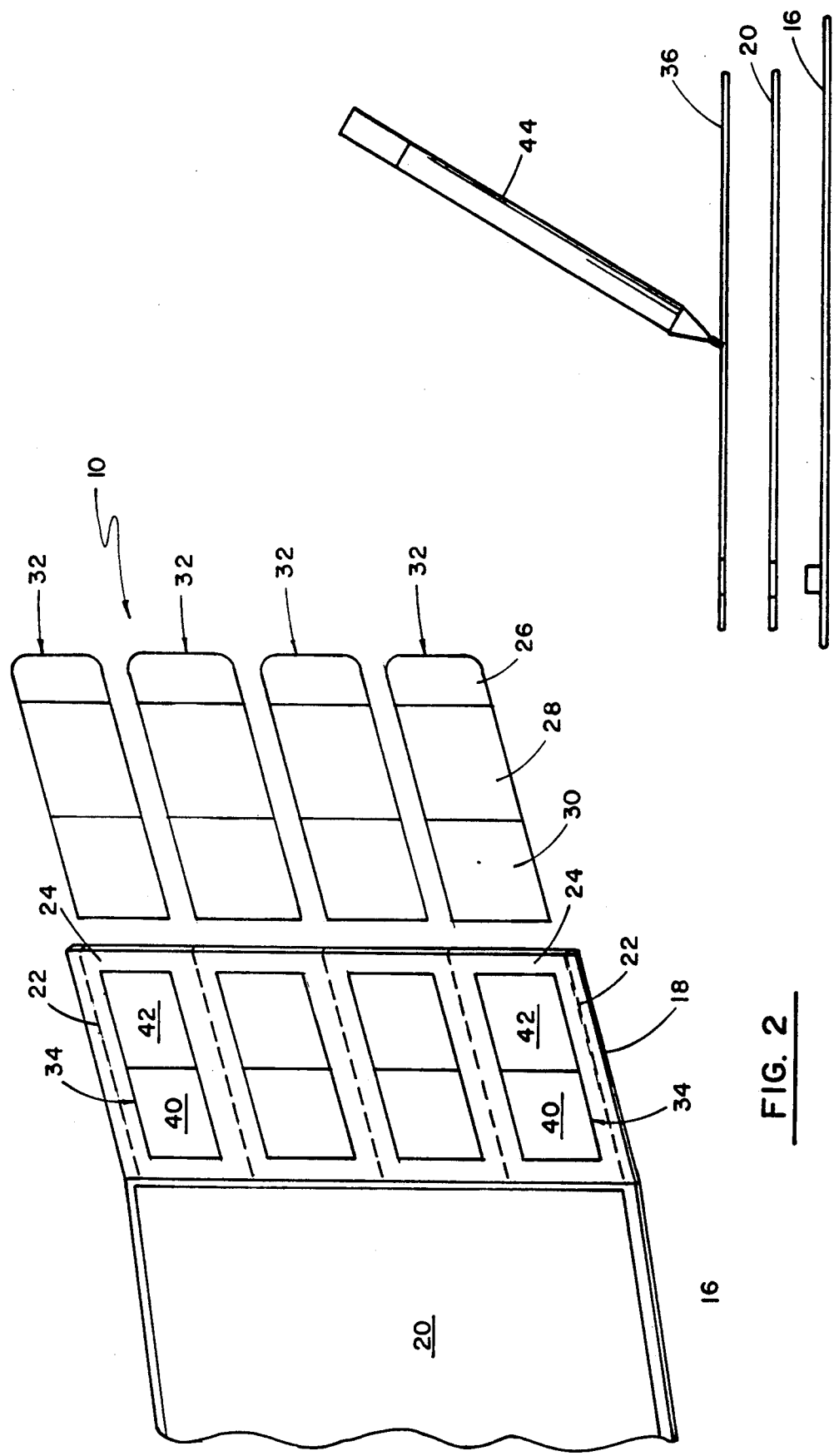

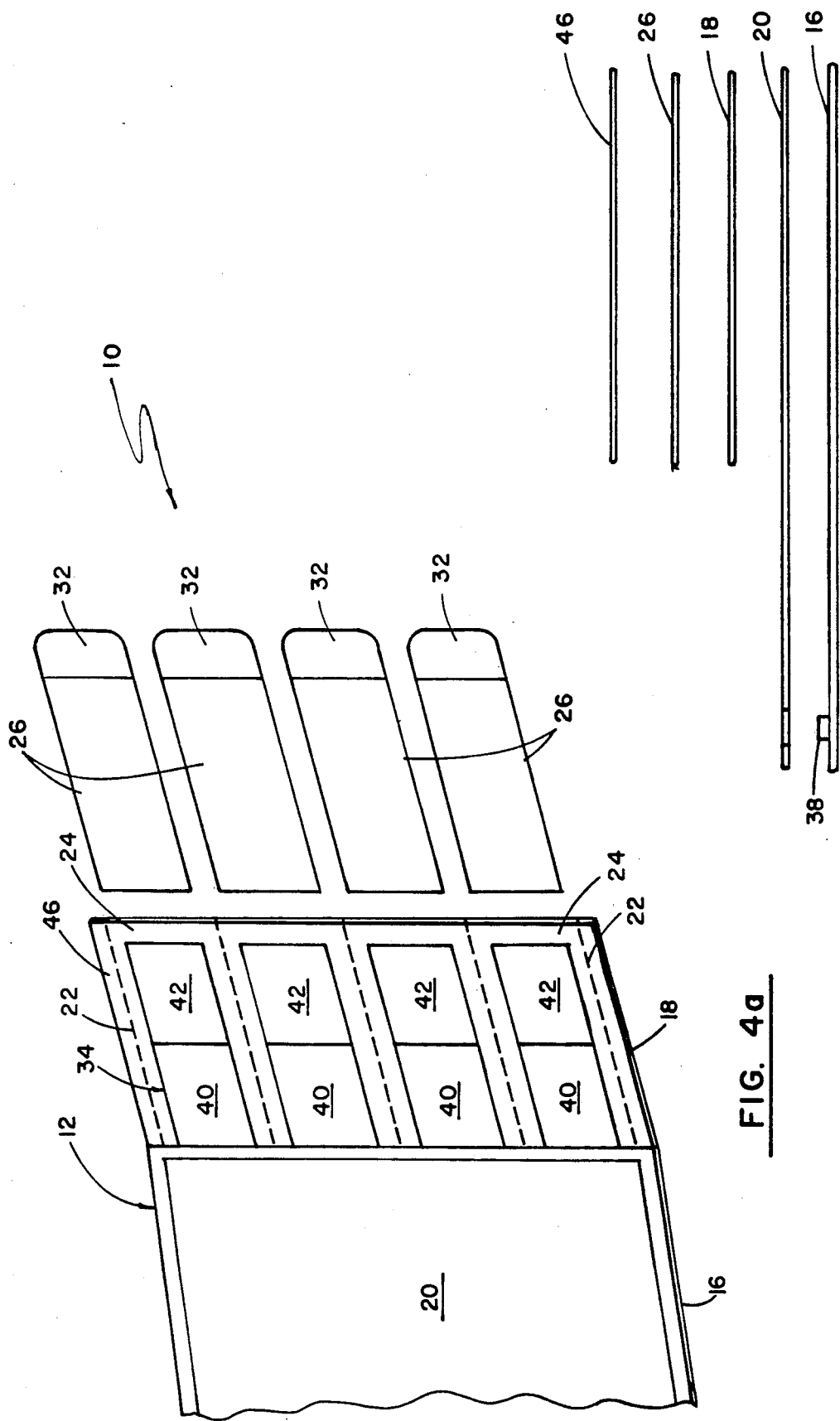

PROGRAMMED LEARNING DEVICE

BACKGROUND OF THE INVENTION

The present invention relates generally to an education device and more specifically to a programmed learning device which can be reused.

It will be appreciated by those skilled in the art that most educational learning devices such as workbooks can only be used once. The goal of a workbook is to provide interaction between the student and the material to be learned. However, using a pen or pencil on a standard workbook will create a workbook that cannot be reused, because after the initial use, the answers will exist for the user. It will further be appreciated by those skilled in the art that the workbook user needs to have the answers to certain questions close at hand to improve the learning process. To this end, there have been several attempts to develop such a workbook.

One such attempt was disclosed in U.S. Pat. No. 4,552,536, issued to A. Kay et al. on Nov. 12, 1985. The Kay et al. device discloses a workbook which has the answers close to the questions. The answers are concealed by a mottled design which discloses the answer when touched by the student. Unfortunately, the Kay et al. device is not sufficiently versatile to be used with more than one set of problems. Further, the Kay et al. device provides no place for the student to write his or her answer.

What is needed, then, is a programmed learning device that is reusable and sufficiently versatile to be usable with more than one set of questions. This programmed learning device must be capable of receiving the student's answer in such a manner that it does not permanently damage the device. This programmed learning device is presently lacking in the prior art.

SUMMARY OF THE INVENTION

A programmed learning device is provided which consists of a folder having a cover, a backing, and a leaf. An information sheet containing information and/or questions is releasably attached to the backing. Windows are placed in the leaf such that certain writing on the information sheet can be seen through the windows. Proximate to each of these windows is a seam which creates a track into which a masking slide can be placed. A sheet of transparent material can be placed over windows. One embodiment of the masking slide has at least one clear section, a tab section, and an opaque section. The opaque section covers the correct answer until the user pulls the tab thereby exposing the correct answer. Another embodiment of the masking slide is entirely opaque. An erasure sheet can be placed over the information sheet to allow the user to mark the answer or take notes on the erasure sheet, prior to looking at the answer that is exposed through the window.

Accordingly, one object of the present invention is to provide a programmed learning device.

Still another object of the present invention is to provide a device which is reusable.

Still another object of the present invention is to provide a device which is versatile, such that it can receive more than one type of information sheet.

Still another object of the present invention is to allow the user to mark a potentially correct answer prior to looking at the actual correct answer, without permanently defacing the device.

BRIEF DESCRIPTION OF THE DRAWINGS

FIG. 2 is an exploded view of the leaf of the programmed learning device of the present invention.

FIG. 3 is an exploded end view showing the relationship between the backing, information sheet, and erasure sheet of the present invention.

FIG. 4a is an exploded perspective view of the programmed learning device of the present invention.

FIG. 4b is an exploded view of upper side of the leaf of the programmed learning device of the present invention.

DESCRIPTION OF THE PREFERRED EMBODIMENT

Figure 1:
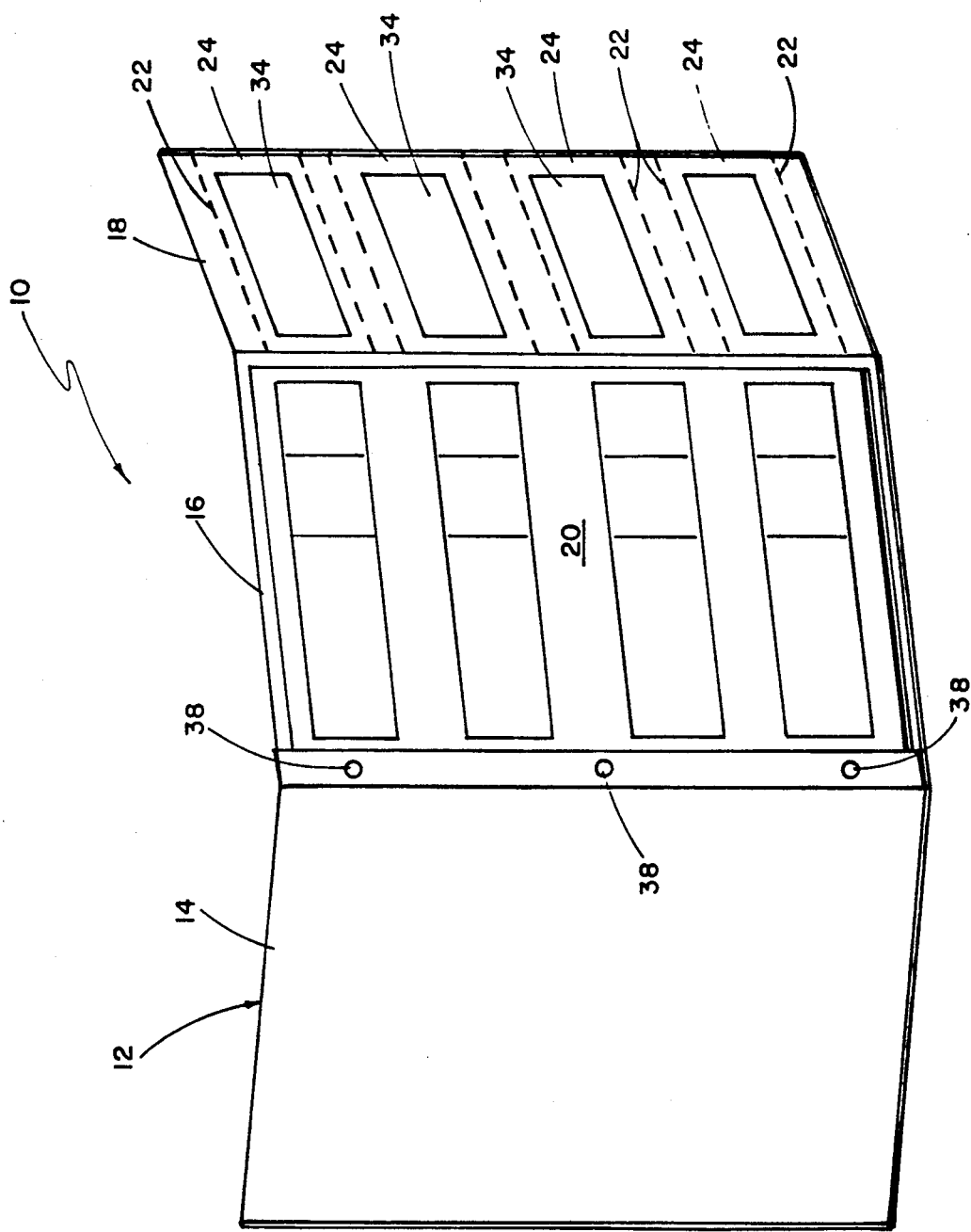
FIG. 1 is a perspective view of the programmed learning device of the present invention.

Referring now to FIG. 1, there is shown generally at 10 the programmed learning device of the present invention. Programmed learning device 10, in the preferred embodiment, has folder 12 which incorporates three sections, cover 14, backing 16, and leaf 18. Cover 14 and backing 16 can be made of heavy paper, cardboard, vinyl or other durable material. Information sheet 20, which will typically contain questions and answers or other printed material, is releasably attached to backing 16 along their respective inner edges. In the preferred embodiment, binders 38 of the three-ring variety receive and secure information sheet 20 and then cover 14 to backing 16.

Leaf 18 can be integral to backing 16 or secured to the outer edge of backing 16 by gluing, stitching, or other conventional method which permits leaf 18 to be manually folded both toward and away from information sheet 20. Cut through leaf 18 are plural windows 34 which are used as means to alternatively obscure and expose information, typically answers, placed on information sheet 20 immediately below leaf 18 when it is folded inwardly. Above and below each window 34 are horizontal seams 22 which define substantially parallel tracks 24 for slidably receiving masking slides 26. Seams 22 are created by stitching, gluing, or other similar conventional means.

Referring now to FIG. 2, there is shown generally at 10 the programmed learning device of the present invention. In this view, leaf 18 is shown folded over information sheet 20, which is releasably attached to backing 16. In this position, windows 34 in leaf 18 border a portion of information sheet 20.

In the preferred embodiment, student answer section 40 of information sheet 20 is bordered by windows 34. Answer section 40 will ordinarily contain the printed answer to a question that is placed to its left on information sheet 20 or can be any other material that should be kept from the view of the user. Masking slides 26 are placed into tracks 24 created by seams 22. The dimensions of slides 26 and windows 34 can be of any size such that the desired question and answers of leaf 18 are visible. In the preferred embodiment, key word section 42 is placed next to answer section 40 and exposed in window 34. Accordingly, slide 26, in one embodiment, has an opaque section 30 which prevents the user from seeing the answer section 40 when slide 26 is fully engaged within track 24. The embodiment of masking slide 26 shown in FIG. 2 also included transparent section 28 for exposing a desired section of information sheet 20. Masking slide 26 also includes tab section 32 which allows the user to grasp and move slide 26 within track 34.

Referring now to FIG. 3, there is shown generally at 16 the backing of the present invention. Binder means 38, part of or proximate and secured to backing 16, receives information sheet 20. Erasable sheet 36 can be placed over information sheet 20 to allow the user to write on erasable sheet 36 as if writing on information sheet 20, without defacing information sheet 20 and device 10.

Referring now to FIGS. 4a and 4b, there is shown a second embodiment of the present invention. In this embodiment, masking slide 26 is entirely opaque. Masking slide 26 fits into tracks 24 created by seams 22. Slide 26 can also have pull tab 32.

As can be seen in FIG. 4b, information sheet 20 is placed against backing 16. Transparent sheet 46 and leaf 18 are secured at seams 22. Slide 26 fits in between sheet 46, which covers windows 34 and leaf 18.

The length of masking slide 26 or of opaque portion 30 of slide 26 is a matter of choice to the manufacturer or designer depending upon the desire to cover answer section 40 and/or keyword section 42.

In the preferred embodiment, erasable sheet 36 is clear plastic or vinyl or similar material. Opaque section 30 can be created by attaching an opaque sheet over the desired section of slide 26, by putting opaque section 30 over the desired section, by being made from a sheet of opaque material, or by coloring opaque section 30 with an opaque marker or paint.

Folder 12 can be created from three individual pieces joined together, one sheet of material that is folded, or any combination thereof.

As can be seen in FIG. 3, pen 44 can be used to write on erasable sheet 36. In the preferred embodiment, pen 44 is an erasable dry pen such as a Sanford ® EXPO ® Dry-Erase Marker. However, any erasable pen can be used. When the user is finished, erasable sheet 36 can be cleaned with a cloth.

Conceivably, leaf 18 could be placed at the intersection of cover 14 and backing 16.

Thus, although there have been described particular embodiments of the present invention of a new and useful programmed learning device, it is not intended that such references be construed as limitations upon the scope of this invention except as set forth in the following claims.

What I claim is:

1. A programmed learning device comprising:
   a. a folder having a backing and a leaf;
   b. an information sheet releasably attached to said backing;
   c. said leaf having at least one window and track means;
   d. a masking slide slidably received by said track means, said slide having an opaque section for covering a portion of said information sheet exposed by said windows; and
   e. an erasure sheet placed over said information sheet.

2. The device of claim 1 further comprising a cover attached to said backing.

3. The device of claim 1 wherein said tracks are created by stitching.

4. The device of claim 1 wherein said slide comprises an opaque section and a tab section.

5. The device of claim 1 wherein said information sheet releasably attaches to said backing using a binder.

6. The device of claim 1 wherein said windows expose an answer section of said information sheet.

7. A programmed learning device comprising:
   a. a folder having a backing attached to a leaf;
   b. an information sheet releasably attached to said backing;
   c. said leaf having at least one window which borders a corresponding portion of said information sheet when said leaf is folded to cover said information sheet;
   d. said leaf having a track means;
   e. a masking slide slidably received by said track means, said slide having an opaque section for covering part of said bordered information sheet; and
   f. an erasure sheet placed over said information sheet.

8. The device of claim 7 wherein said information sheet is received by said binder means proximate to said backing.

9. The device of claim 7 wherein said slide comprises a tab section.

10. The device of claim 7 wherein said track is defined by stitching placed in substantially parallel alignment above and below said window.

11. A programmed learning device comprising:
    a. a folder having a cover, a backing, and a leaf;
    b. said leaf comprising two sheets of paper laid upon one another having a window and a track defined by stitching said two sheets together;
    c. a masking slide received by said track having an opaque section;
    d. an information sheet releasably attached to said backing at a binder;
    e. an erasure sheet covering said information sheet; and
    f. an erasable pen for use with said erasure sheet.

12. The device of claim 11 wherein said masking slide comprises a tab section.

* * * * *